(12) United States Patent
Lee (10) Patent No.: US 7,829,056 B2
(45) Date of Patent: Nov. 9, 2010

(54) METHOD OF COATING A SUBSTRATE WITH A POLYMER HAVING A COMBINATION OF CROWN ETHER AND CARBON NANOTUBES HAVING GUANIDINE GROUPS

(75) Inventor: Hai Sung Lee, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 656 days.

(21) Appl. No.: 11/822,468

(22) Filed: Jul. 6, 2007

(65) Prior Publication Data

US 2008/0193656 A1    Aug. 14, 2008

Related U.S. Application Data

(62) Division of application No. 11/126,375, filed on May 11, 2005, now Pat. No. 7,261,924.

(30) Foreign Application Priority Data

Jan. 27, 2005    (KR) ...................... 10-2005-0007585

(51) Int. Cl.
   *D01F 9/12*    (2006.01)
   *B32B 9/00*    (2006.01)
(52) U.S. Cl. .............. 423/447.2; 423/447.1; 423/447.3; 423/460; 977/745; 977/746; 977/847; 428/688
(58) Field of Classification Search .............. 423/447.1, 423/447.2, 447.3, 445 B; 977/742–754, 977/842–848; 428/367, 688
See application file for complete search history.

(56) References Cited

U.S. PATENT DOCUMENTS 6,187,823 B1 *   2/2001   Haddon et al. ................. 516/32

(Continued)

OTHER PUBLICATIONS

Bahr, et al., Covalent chemistry of single-wall carbon nanotubes, J. Mater. Chem. 2002; 12: 1952-1958.*

*Primary Examiner*—Stuart L. Hendrickson
*Assistant Examiner*—Daniel C. McCracken
(74) *Attorney, Agent, or Firm*—McDermott Will & Emery LLP (57) ABSTRACT

Disclosed herein is a method of forming a guanidine group on carbon nanotubes to improve the dispersibility of carbon nanotubes, a method of attaching carbon nanotubes having guanidine groups to a substrate, and carbon nanotubes and a substrate manufactured by the above methods. The method of forming the guanidine group on the carbon nanotubes includes forming a carboxyl group on the carbon nanotubes, and forming the guanidine group on the carboxyl group of the carbon nanotubes. In addition, the method of attaching the carbon nanotubes having guanidine groups to the substrate includes coating a substrate with a polymer having crown ether attached thereto, drying the polymer layer having crown ether attached thereto formed on the substrate to be semi-dried, and coating the semi-dried polymer layer with a solution including carbon nanotubes having guanidine groups dispersed therein. The carbon nanotubes having guanidine groups, which are manufactured by the method of the current invention, are hydrogen bonded with the solvent molecule capable of reacting with the guanidine group to form the hydrogen bond, and thus, are uniformly dispersed in the solvent. Further, by using the properties of the guanidine group capable of being selectively combined with crown ether, the carbon nanotubes having guanidine groups are aligned perpendicularly to the substrate at regular intervals thereon.

12 Claims, 5 Drawing Sheets
(4 of 5 Drawing Sheet(s) Filed in Color)

U.S. PATENT DOCUMENTS 6,331,262 B1 * 12/2001 Haddon et al. .............. 252/502
6,368,569 B1 * 4/2002 Haddon et al. .............. 423/460
2003/0012723 A1 * 1/2003 Clarke ........................ 423/460
2003/0026754 A1 * 2/2003 Clarke et al. ............. 423/447.2

* cited by examiner

METHOD OF COATING A SUBSTRATE WITH A POLYMER HAVING A COMBINATION OF CROWN ETHER AND CARBON NANOTUBES HAVING GUANIDINE GROUPS

RELATED APPLICATION

This application is a Divisional of U.S. application Ser. No. 11/126,375, filed May 11, 2005 now U.S. Pat. No. 7,261,924, claiming priority of Korean Application No. 10-2005-0007585, filed Jan. 27, 2005, the entire contents of each of which are hereby incorporated by reference.

BACKGROUND OF THE INVENTION

1. Field of the Invention

The present invention relates, generally, to methods of forming a guanidine group on carbon nanotubes (CNTs) and of attaching CNTs having guanidine groups to a substrate, and CNTs and a substrate manufactured by the above methods. More specifically, the present invention relates to a method of forming a guanidine group on CNTs to improve the dispersibility of CNTs, a method of attaching CNTs having guanidine groups to a substrate by combining the guanidine group with the crown ether, and CNTs and a substrate manufactured by the above methods.

2. Description of the Related Art

Dispersion of CNTs is essential for all pre-treatment processes using the CNTs. However, in cases where the CNTs are dispersed in water or a protic solvent, it is difficult to uniformly disperse the CNTs, composed completely of carbons, in the solvent. Therefore, a dispersing agent, such as a surfactant, is used. To achieve the uniform dispersion of the CNTs, the CNTs that are partially negatively charged should be formed in the shapes of micelles or inverse micelles including CNTs surrounded by the dispersing agent. As such, the dispersing agent is used in a predetermined concentration or more. In addition, various dispersing agents, such as non-ionic-, cationic-, anionic-, and polymeric-type dispersing agents, are typically used. However, the dispersing agent surrounding the CNTs may function as an impurity in the process of using the CNTs.

Hence, since the dispersing agent used for the dispersion of the CNTs may cause problems in the subsequent process, methods of introducing a functional group able to directly react with the solvent to the CNTs have been proposed to uniformly disperse the CNTs while solving the above problems. For example, methods of forming a carboxyl group, a hydroxy group or an amine group on CNTs have been known.

In this regard, U.S. Pat. No. 6,368,569 discloses a method of forming a carboxyl group on CNTs, and U.S. Pat. Nos. 6,187,823 and 6,331,262 disclose a method of forming an amine group on CNTs. When the carboxyl group (—COOH) as a hydrophilic functional group is introduced to the CNTs, the CNTs are surrounded with water molecules due to the hydrogen bond between the carboxyl group and the water molecule of H—O—H. Thus, the CNTs are uniformly dispersed at regular intervals in water, even without the use of the dispersing agent. The amine group, which is a hydrophilic functional group, is hydrogen bonded with a water molecule so that the CNTs are dispersed in the solvent.

However, in the cases where a metal cation is present in the solution, the carboxyl group or amine group of the CNTs may be undesirably chelated with the metal cation.

SUMMARY OF THE INVENTION

Accordingly, the present invention has been made keeping in mind the above problems occurring in the related art, and an object of the present invention is to provide a method of forming a guanidine group, which is not chelated with a metal cation present in a solution, on CNTs.

Another object of the present invention is to provide a method of forming a guanidine group on CNTs to increase the dispersibility of CNTs.

A further object of the present invention is to provide a method of attaching CNTs having guanidine groups to a substrate.

Yet another object of the present invention is to provide CNTs having guanidine groups.

Still another object of the present invention is to provide a substrate having CNTs attached thereto.

In order to accomplish the above objects, according to a first aspect of the present invention, a method of forming a guanidine group on CNTs is provided, which comprises forming a carboxyl group on CNTs; and forming a guanidine group on the carboxyl group of the CNTs.

According to a second aspect of the present invention, CNTs are provided, which comprise one or more bonded moieties, in which the moiety is represented by Formula 1, below:

Formula 1

According to a third aspect of the present invention, a method of attaching CNTs having guanidine groups to a substrate is provided, which comprises coating a substrate with a polymer having crown ether attached thereto; drying the polymer layer having crown ether attached thereto formed on the substrate to be semi-dried; and coating the semi-dried polymer layer with a solution including CNTs having guanidine groups dispersed therein.

According to a fourth aspect of the present invention, a method of attaching CNTs having guanidine groups to a substrate is provided, which comprises reacting a polymer having crown ether attached thereto with CNTs having guanidine groups, to prepare a polymer having a combination of crown ether and CNTs having guanidine groups; and coating a substrate with the polymer having a combination of crown ether and CNTs having guanidine groups.

According to a fifth aspect of the present invention, a method of attaching CNTs having guanidine groups to a substrate is provided, which comprises manufacturing a polymer having crown ether attached thereto into a semi-dried film; and coating the semi-dried film with a solution including CNTs having guanidine groups dispersed therein.

According to a sixth aspect of the present invention, a method of attaching CNTs having guanidine groups to a substrate is provided, which comprises reacting a polymer having crown ether attached thereto with CNTs having guanidine groups, to prepare a polymer having a combination of crown ether and CNTs having guanidine groups; and manufacturing the polymer having a combination of crown ether and CNTs having guanidine groups into a semi-dried film.

According to a seventh aspect of the present invention, a method of attaching CNTs having guanidine groups to a substrate is provided, which comprises dipping an anodized aluminum oxide (AAO) substrate that is installed to a cathode into a solution including CNTs having guanidine groups dispersed therein; and performing electrophoresis or electroplating.

According to an eighth aspect of the present invention, a substrate having CNTs attached thereto is provided, which comprises a substrate; a polymer layer having crown ether attached thereto; and a coating layer of CNTs having one or more bonded moieties, in which the moiety is represented by Formula 1, below:

Formula 1

According to a ninth aspect of the present invention, a substrate having CNTs attached thereto is provided, which comprises a substrate; and a polymer layer formed by reacting a polymer having crown ether attached thereto with CNTs having one or more bonded moieties, in which the moiety is represented by Formula 1, below:

Formula 1

According to a tenth aspect of the present invention, a substrate having CNTs attached thereto is provided, which comprises an AAO substrate; and CNTs having one or more bonded moieties inserted into pores of the substrate, in which the moiety is represented by Formula 1, below:

Formula 1

BRIEF DESCRIPTION OF THE DRAWINGS

The patent or application file contains at least one drawing executed in color. Copies of this patent or patent application publication with color drawings will be provided by the Office upon request and payment of the necessary fee.

The above and other objects, features and advantages of the present invention will be more clearly understood from the following detailed description taken in conjunction with the accompanying drawings, in which:

FIG. 1b is a view showing a three-dimensional molecular model of FIG. 1a;

DESCRIPTION OF THE PREFERRED EMBODIMENTS

Hereinafter, a detailed description will be given of the present invention.

The present invention pertains to a method of forming a guanidine group on CNTs so that the CNTs are uniformly dispersed in a solvent. The CNTs having guanidine groups, manufactured by the method of the present invention, are uniformly dispersed in the solvent that is able to react with the guanidine group to form a hydrogen bond, even without an additional dispersant. In addition, in the case where a metal cation is present in the solvent, the CNTs having guanidine groups of the present invention are not chelated with the metal cation.

The CNTs are classified in accordance with the manufacturing method thereof and the number of walls thereof. In the case where the CNTs are classified depending on the number of walls, single-walled carbon nanotubes (SWNTs) and multi-walled carbon nanotubes (MWNTs) are typically used. Further, in the classification based on the manufacturing method, there are CNTs resulting from CVD (Chemical Vapor Deposition) and CNTs obtained by arc-discharge. In addition, two types of CNTs, that is, SWNTs and MWNTs may be formed according to each manufacturing method. In the present invention, all of the CNTs mentioned above may be used.

With the aim of preparing a functional site required to form the guanidine group on the CNTs, a carboxyl group is formed on the CNTs. For this, the CNTs are added to a mixture of nitric acid and sulfuric acid mixed at a volume ratio of 3:1 so that the ratio of the volume of mixture to the weight of CNTs is 8000:1, heated to a predetermined temperature, and reacted with sonication, thereby forming a —COOH group on the CNTs. While the —COOH group is formed, an —OH group is additionally formed. As such, the amount of CNTs may be increased or decreased in the range of ±20%. Since the CNTs are composed of stable bonds between the carbons, they require high activation energy for dissociation of stable C—C bonds and the introduction of another function group. Thus, the CNTs are heated to about 50-60° C., and then reacted for about 22-26 hr, and preferably, for 24 hr, with sonication. If the temperature is lower than 50° C., the activation energy does not reach the level required for reaction, and thus the reaction does not take place. Meanwhile, if the temperature is higher than 60° C., economic benefits are negated. In addition, the reaction time shorter than 22 hr results in insufficient C—C bond dissociation in the CNTs. Also, the dissociated C—C bonds are not oxidized, and thus, are undesirable. Conversely, even if the reaction time exceeds 26 hr, the dissociation of C—C bonds is not further promoted.

The vibration energy of C—C bonds increases due to heating and sonification, whereby the dissociation of C—C bonds is promoted. In particular, the C—C bonds are dissociated at terminal or defective portions of the CNTs. Further, since delocalized π-electrons are present on the surface of CNTs, the C—C bonds may be easily dissociated. The carbons, which are present on the terminal portions of the CNTs, have only two or three bonds and thus are unstable. Therefore, highly reactive C—C bonds are easily dissociated, whereby the CNTs are cut into predetermined sizes due to such dissociation of C—C bonds.

While the C—C bonds are dissociated, bond electrons are localized to any one atom, thereby forming carbon ions, such as C⁺ and C⁻, or the electrons are equally distributed to the two carbons, forming radical ions. In addition, since the used nitric acid and sulfuric acid are highly reactive and the dissociated carbon ions or carbon radicals are also unstable, and therefore highly reactive, the reaction therebetween may easily occur. Therefore, the —COOH group is formed on the dissociated C—C bond portion of the CNTs through the oxidation. In such a case, the —OH group may be further formed thereon. The oxidation takes place due to the nitric acid and sulfuric acid used.

In the CNTs having —COOH group (hereinafter, referred to as 'CNTs-COOH'), the guanidine group is bonded to the —COOH group through the amide or peptide formation reaction between the —COOH group and the guanidine group in the compound having the guanidine group. The guanidine group is formed on CNTs-COOH as represented by Reaction 1, below:

As is apparent from Reaction 1, the CNTs having one or more bonded moieties are formed, in which the moiety is represented by Formula 1. Although the number of moieties of Formula 1 is not particularly limited, it is determined so that the equivalence ratio of the CNTs to the moiety of Formula 1 is in the range of from 1:1 to 1:2. As such, when the excess equivalent number of guanidine groups is added or the excess coupling agent is added, the CNTs and the moiety of Formula 1 may be bonded at the equivalence ratio of 1:2.

Formula 1

CNTs-COOH react with the compound having the guanidine group (hereinafter, referred to as 'guanidine reactant') in an inert atmosphere, for example, but without being limited to, a nitrogen or argon atmosphere. In this case, the coupling agent is added for the amine formation reaction between —COOH and guanidine. The guanidine reactant includes, but is not limited to, guanidine represented by Formula 2, below, cyanoguanidine represented by Formula 3, below, or guanidine thiocyanide represented by Formula 4, below.

Since the guanidine reactant reacts with CNTs-COOH at the equivalence ratio of 2:1, the guanidine reactant is reacted with CNTs-COOH in consideration of the above condition. For example, if the guanidine reactant is used in a larger amount than CNTs-COOH, exceeding the above equivalence ratio, and if the coupling agent remains, the non-reactive guanidine reactant may react with the remaining coupling agent, hence forming the by-products.

Formula 2

Formula 3

Formula 4

In addition, the coupling agent includes, for example, 1-(3-dimethylaminopropyl)-3-ethyl-carboimide hydrochloride (EDC), dicyclohexylcarbodiimide (DCC), oxalic acid, or oxalic acid chloride.

The formation of guanidine group is achieved by reacting CNTs-COOH, the guanidine reactant and the coupling agent in the presence of the solvent for 6-10 hr while stirring them at 25-50° C. If the reaction temperature is lower than 25° C., the activation energy required for the reaction is not obtained. On the other hand, if the reaction temperature exceeds 50° C., the activation energy required for the reaction is increased and thus the reaction occurs quickly. However, the molecules may be undesirably dissociated. In addition, when the reaction time is less than 6 hr, the activation energy required for the reaction of molecules is not undesirably provided. Conversely, if the reaction time exceeds 10 hr, over-reaction may occur between the molecules. Also, the by-products and the reaction product having low stability may be formed.

Since the coupling agent used for the reaction acts as the kind of catalyst, it is used in a catalytic amount. For example, the coupling agent is used in an amount of 0.4-0.5 equivalents, based on 1 equivalent of CNTs-COOH. If the coupling agent is used in an amount less than 0.4 equivalents, the activation of carbonyl group is low, obtaining CNTs having guanidine groups at low yields. On the other hand, the use of coupling agent exceeding 0.5 equivalents negates economic benefits. The solvent used for the formation of guanidine group includes dichloromethane.

When the carboxyl group and the guanidine group are introduced to the CNTs, processes accompanied to CNTs washing, neutralization, filtration, separation, removal of impurities, etc., may be performed according to techniques known in the art, if required.

The guanidine group consists of two $NH_2$ single bonded to central carbon and one $NH$ double bonded thereto, and is a strongly basic functional group having high pKa or pH. In addition, the guanidine group has three nitrogen atoms having high charge density (or lone pair electrons) on which charges are distributable. Hence, the CNTs having guanidine groups are further effectively dispersed in the solvent, attributed to the more uniform charge distribution, compared to conventional CNTs having carboxyl groups or amine groups. Moreover, in the case which the guanidine group is electrically charged by changes in the pH of the solution, charges are uniformly distributed on the three nitrogen atoms of the guanidine group, causing electrostatic interactions in the CNTs having guanidine groups. Thereby, the CNTs having guanidine groups are uniformly dispersed in an aqueous solution. The charge distribution of the guanidine group in the acidic solution is represented by Formula 5, below:

Formula 5

Therefore, the CNTs having guanidine groups (hereinafter, referred to as 'CNTs-CO—$(NH)_2NH_2$') are present in the state of being uniformly dispersed. The reason is that CNTs-CO—$(NH)_2NH_2$ are disposed at predetermined intervals required for the interactions between the CNTs and the solvent molecule and between the two CNTs, due to the hydrogen bond formed by the interaction between the guanidine group and the solvent, or due to the repulsive force caused by the electrostatic interaction of CNTs-CO—$(NH)_2NH_2$ through the charge distribution.

That is, CNTs-CO—$(NH)_2NH_2$ are uniformly dispersed at regular intervals in any solvent able to react with a guanidine group to form a hydrogen bond, for example, water (e.g., deionized water or $3^{rd}$ distilled water), or a protic solvent, such as alcohol including methanol, ethanol, isopropylalcohol, etc.

Whether the guanidine group has been formed on the CNTs is confirmed using FT-IR, Raman or XPS analysis.

On the other hand, since the guanidine group is selectively combined with the crown ether molecule, CNTs-CO—$(NH)_2NH_2$ may be attached to the substrate so as to be aligned perpendicularly to the substrate at regular intervals thereon.

Thus, the present invention provides a substrate including CNTs having one or more bonded moieties attached thereto, in which the moiety is represented by Formula 1.

Below, a method of attaching CNTs-CO—$(NH)_2NH_2$ to the substrate is particularly described.

Since the structure of the cyclic crown ether molecule three-dimensionally corresponds to that of the tripod-shaped guanidine group as in the relationship between key and lock, the guanidine group is selectively combined with the crown ether. In addition, the guanidine group and the crown ether molecule may be selectively combined, even though undergoing influences due to the electrostatic interactions.

Figure 1A:
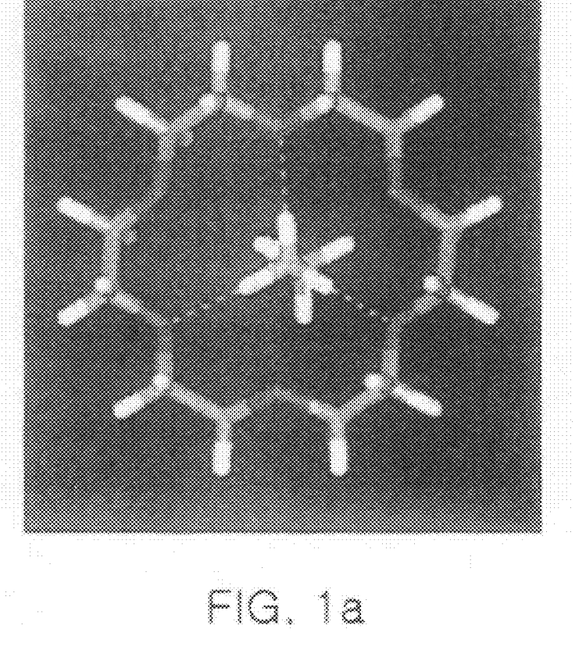
FIG. 1a is a molecular model photograph showing the molecular recognition between 18-crown-6-ether and guanidine.
Figure 1B:
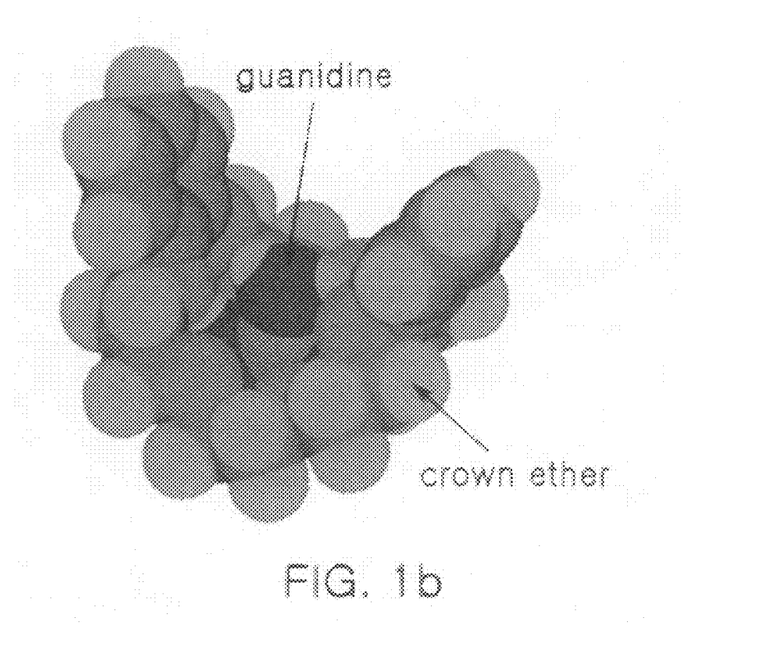

That is, the electrostatic interactions between non-shared electron pairs of oxygen on the ether molecule and hydrogen on the guanidine molecule are caused by the molecular recognition of the crown ether and the guanidine group. Thus, the crown ether and the guanidine are spontaneously combined even without an external driving force, due to the size effect and hydrogen bond through the above electrostatic interactions. The integrally combined crown ether and guanidine group is shown in FIGS. 1a and 1b.

In the attachment of CNTs-CO—$(NH)_2NH_2$ at regular intervals to the substrate, the substrate includes, for example, copper, aluminum or nickel metal substrate, or a polymer film having crown ether attached thereto or a polymer film having a combination of crown ether and guanidine. For the reaction between the crown ether and the guanidine group of CNTs-CO—$(NH)_2NH_2$ when attaching the CNTs-CO—$(NH)_2NH_2$ to the metal substrate, the substrate is coated with the polymer having crown ether attached thereto, before CNTs-CO—$(NH)_2NH_2$ are attached to the substrate. Likewise, the polymer having crown ether attached thereto is reacted with CNTs-CO—$(NH)_2NH_2$ to form the polymer having a combination of crown ether and guanidine, which is then applied on the substrate, thereby manufacturing a substrate on which the CNTs are aligned perpendicularly to the substrate. The polymer film having crown ether attached thereto to which the CNTs are attached, or the polymer film having a combination of crown ether and guanidine of CNTs-CO—$(NH)_2NH_2$ may be used in electronic devices requiring flexibility, for example, displays.

The polymer having crown ether attached thereto is obtained by dispersing crown ether and a polymer in a solvent and then reacting them while stirring at room temperature (about 20-25° C.) for about 2-5 hr. If the reaction time is less than 2 hr, the resultant reaction product may undesirably have a molecular weight corresponding to oligomers or analogues thereof, rather than the molecular weight of a polymer. Meanwhile, the reaction time exceeding 5 hr results in negated economic benefits.

The crown ether includes, for example, but is not limited to, 18-member crown ether represented by Formula 6, below, dibenzo-18-crown-6-ether represented by Formula 7, below, and dibenzo-24-member crown ether represented by Formula 8, below:

Formula 6

-continued

Formula 7

Formula 8

The molecular sizes of the crown ethers represented by Formulas 6 to 8 are suitable for bonding with the guanidine groups represented by Formulas 2 to 4.

The polymer includes a conductive polymer selected from among polyacetylenes, polyphenylenes, polyanilines, polythiphenes, polypyrroles, mixtures of poly(3,4-ethylenedioxythiophenes) and poly(styrenesulfonic acids) (PEDOT:PSS), and poly(4-vinylphenols), or polymethylmethacrylates (PMMA), polystyrenes (PS), or derivatives thereof. The derivative of the polymer means a material bonded with a dopant to increase the electron mobility of the polymer, which is generally known in the art. The mixture of poly(3,4-ethylenedioxythiophene) and poly(styrenesulfonic acid) (PEDOT: PSS) is called Baytron P, which is available from Bayer AG, Germany, and includes poly(3,4-ethylenedioxythiophene) and poly(styrenesulfonic acid) mixed at a ratio of about 4:6.

As for the metal substrate having high conductivity, the general polymer as mentioned above is usable. When the metal substrate having low conductivity is coated with the polymer having crown ether attached thereto or the polymer having a combination of crown ether and guanidine, although the general polymer as mentioned above is used, the use of the conductive polymer is more preferable. In the case where the polymer film having crown ether attached thereto or the polymer film having a combination of crown ether and guanidine of CNTs-CO—(NH)$_2$NH$_2$ is used as the substrate, the conductive polymer is used. This is because CNTs-attached assemblies, which are used as field emission devices or electronic devices such as displays, require high conductivity.

The conductivity of the metal substrate may vary with the dopant to be added when manufacturing the metal substrate, which is generally known to those skilled in the art. Those skilled in the art may appropriately use the conductive polymer, depending on the conductivity of the metal substrate and the conductivity required for electronic devices.

The polymer having crown ether attached thereto is prepared using a solvent, such as pyridine or pyrrolidine.

In the reaction of polymer and crown ether, the crown ether is used in an amount of 10-20 parts by weight, based on 100 parts by weight of the polymer. When the amount of crown ether is less then 10 parts by weight, the crown ether attaches less to a side chain of the polymer, and thus, may not be uniformly formed at desired intervals on the coating surface. On the other hand, if the amount of crown ether exceeds 20 parts by weight, a large amount of crown ether is undesirably attached to the side chain of the polymer, or the likelihood of the crown ether becoming attached to other positions, as well as the side chain of the polymer, undesirably increases.

The polymer having crown ether attached thereto is applied on the metal substrate, or is reacted with CNTs-CO—(NH)$_2$NH$_2$ to be formed into a polymer having a combination of crown ether and guanidine or a film. The coating process and the film preparation process may be performed by any method known in the art, and are not particularly limited. The coating process may be performed by, but is not limited to, any method known in the art, for example, spin coating, dip coating, spray coating, flow coating, or screen printing. The film is mainly obtained using a printing process.

The coating layer is formed to a thickness of about 200-1000 µm on one surface of the metal substrate. In addition, the film is prepared to be about 1-2 mm thick. As such, the thickness of the coating layer or film is not particularly limited for the attachment of the CNTs. However, in the coating layer or film to which the CNTs have been attached for use in field emission devices or other electronic devices, since the conductivity or resistance varies with the thickness of the above layer or film, the coating layer or film is preferably formed in the above thickness range.

The coating layer or film of the polymer having crown ether attached thereto is dried in a semi-dry state of B-step. Herein, the semi-dry state means that a predetermined target is partially dried. For this, a drying process is performed at about 50-80° C. for about 3-10 hr.

Subsequently, the semi-dried coating layer or film is coated with the solution including CNTs-CO—(NH)$_2$NH$_2$ dispersed therein. The solution including CNTs-CO—(NH)$_2$NH$_2$ dispersed therein is prepared by dispersing CNTs-CO—(NH)$_2$NH$_2$ in the water or the protic solvent, such as alcohol. As such, since the guanidine group formed on the CNTs in the solution reacts with the crown ether in the coating layer, the amount of CNTs-CO—(NH)$_2$NH$_2$ to be dispersed in the solvent corresponds to 1/100-1/500, based on the weight of the polymer having crown ether attached thereto. The reason why the amount is limited as mentioned above is described below.

The semi-dried coating layer or film of the polymer having crown ether attached thereto is coated with the solution having CNTs-CO—(NH)$_2$NH$_2$ dispersed therein, thus combining the crown ether with the guanidine group. Thereby, the CNTs are attached to the substrate while being aligned perpendicularly to the substrate at regular intervals thereon.

The reaction between guanidine and crown ether takes place according to the self-assembly manner (Molecular recognition method), without the need for additional external conditions. Thus, the coating layer or film of the polymer having crown ether attached thereto is coated with the solution including CNTs-CO—(NH)$_2$NH$_2$ dispersed therein, resulting in spontaneously combined crown ether and guanidine. That is, crown ether and guanidine are spontaneously reacted at room temperature (e.g., 20-25° C.) and at neutral pH, to form a combination therebetween.

The substrate having CNTs aligned perpendicularly to the substrate at regular intervals thereon is manufactured by reacting CNTs-CO—(NH)$_2$NH$_2$ with the polymer having crown ether attached thereto, to prepare a polymer having a combination of guanidine and crown ether, which is then applied on the substrate, or which is then formed into a film.

That is, the polymer having crown ether attached thereto is added along with CNTs-CO—(NH)$_2$NH$_2$ to the solvent and then reacted while being stirred at room temperature for 20-40 min. Thereby, the guanidine group of the CNTs is combined with the crown ether, and thus, the polymer having a combination of guanidine and crown ether is formed. As such, the reaction solvent includes, for example, pyridine, pyrrolidine, methylene chloride, etc. In addition, CNTs-CO—(NH)$_2$NH$_2$ are added in an amount of 1/100-1/500, based on the weight of the polymer having crown ether attached thereto, to the solvent. Since the CNTs are nano-sized, great numbers of CNTs are provided, despite the very small weight. Hence, the above amount of CNTs-CO—(NH)$_2$NH$_2$ is sufficient to react with crown ether bonded to the polymer. As for the control of emission site density for application to field emission devices, CNTs-CO—(NH)$_2$NH$_2$ are preferably used in the above amount range because too many CNTs per unit area may negatively affect the emission of electrons. When CNTs-CO—(NH)$_2$NH$_2$ are used in an amount less than a lower limit, the number of CNTs to be aligned is low, and thus, the CNTs may not exhibit maximal effects in field emission devices or electronic devices. Meanwhile, if the amount of CNTs-CO—(NH)$_2$NH$_2$ exceeds an upper limit, non-reactive CNTs excessively remain due to the limited number of crown ether molecules present on the surface, thus negating economic benefits.

Then, the polymer having a combination of crown ether and guanidine of CNTs-CO—(NH)$_2$NH$_2$ is applied on the substrate, and then dried, thereby manufacturing a substrate having CNTs aligned perpendicularly to the substrate at regular intervals thereon. The coating process may be performed as in the above manner.

In addition, the polymer having a combination of crown ether and guanidine of CNTs-CO—(NH)$_2$NH$_2$ is shaped into a film, thereby manufacturing a substrate having CNTs aligned perpendicularly to the substrate at regular intervals thereon.

Further, CNTs-CO—(NH)$_2$NH$_2$ are inserted into small pores in the AAO substrate through electrophoresis or electroplating, and thus, CNTs-CO—(NH)$_2$NH$_2$ are attached to the AAO substrate to be uniformly aligned thereon. The AAO substrate may consist of any anodized aluminum oxide prepared by any method.

The positively charged CNTs are inserted into 500-700 nm deep pores in the AAO template installed to a cathode through electrophoresis or electroplating. At this time, this process is performed at a DC current of 20-50 V for 10-20 min. The electrophoresis or electroplating using the AAO template is preferably carried out in the acidic solution, pH 3-5. This is because CNTs-CO—(NH)$_2$NH$_2$ have a high charge characteristic in the acidic solution, whereby it is easily movable toward the AAO template.

In the insertion of the CNTs into the AAO pores through the electrophoresis or electroplating, if the CNTs have no polar functional group, the mobility and strength of the CNTs are lowered even when applying the current for electrophoresis or electroplating.

However, the guanidine group as a polar functional group in CNTs-CO—(NH)$_2$NH$_2$ of the present invention is more easily moved to the AAO substrate when the current is applied to the CNTs. As well, CNTs-CO—(NH)$_2$NH$_2$ manufactured by the method of the present invention have a smaller size and higher charge characteristic than conventional CNTs surrounded with dispersing agent. Therefore, when CNTs-CO—(NH)$_2$NH$_2$ are attached to the AAO substrate through electrophoresis or electroplating, the CNTs are perpendicularly inserted into small pores of the AAO template.

In addition, since CNTs-CO—(NH)$_2$NH$_2$ show opposite type charge in respect to changes in pH, the CNTs may be attached while changing the value of pH, depending on the kinds of substrate to which the CNTs are to be attached.

A better understanding of the present invention may be obtained in light of the following examples which are set forth to illustrate, but are not to be construed to limit the present invention.

EXAMPLE 1

40 mg of MWNTs (Iljin Nanotech Co. Ltd., Korea) were added to a mixture of 60 ml of H$_2$SO$_4$ and 20 ml of HNO$_3$, and then reacted for 24 hr with ultra-sonication at 50° C. As such, the sonication was performed at about 30 kHz. The strongly acidic reaction solution was diluted with deionized water to be a neutral solution, and filtered using a vacuum filter.

Figure 2:
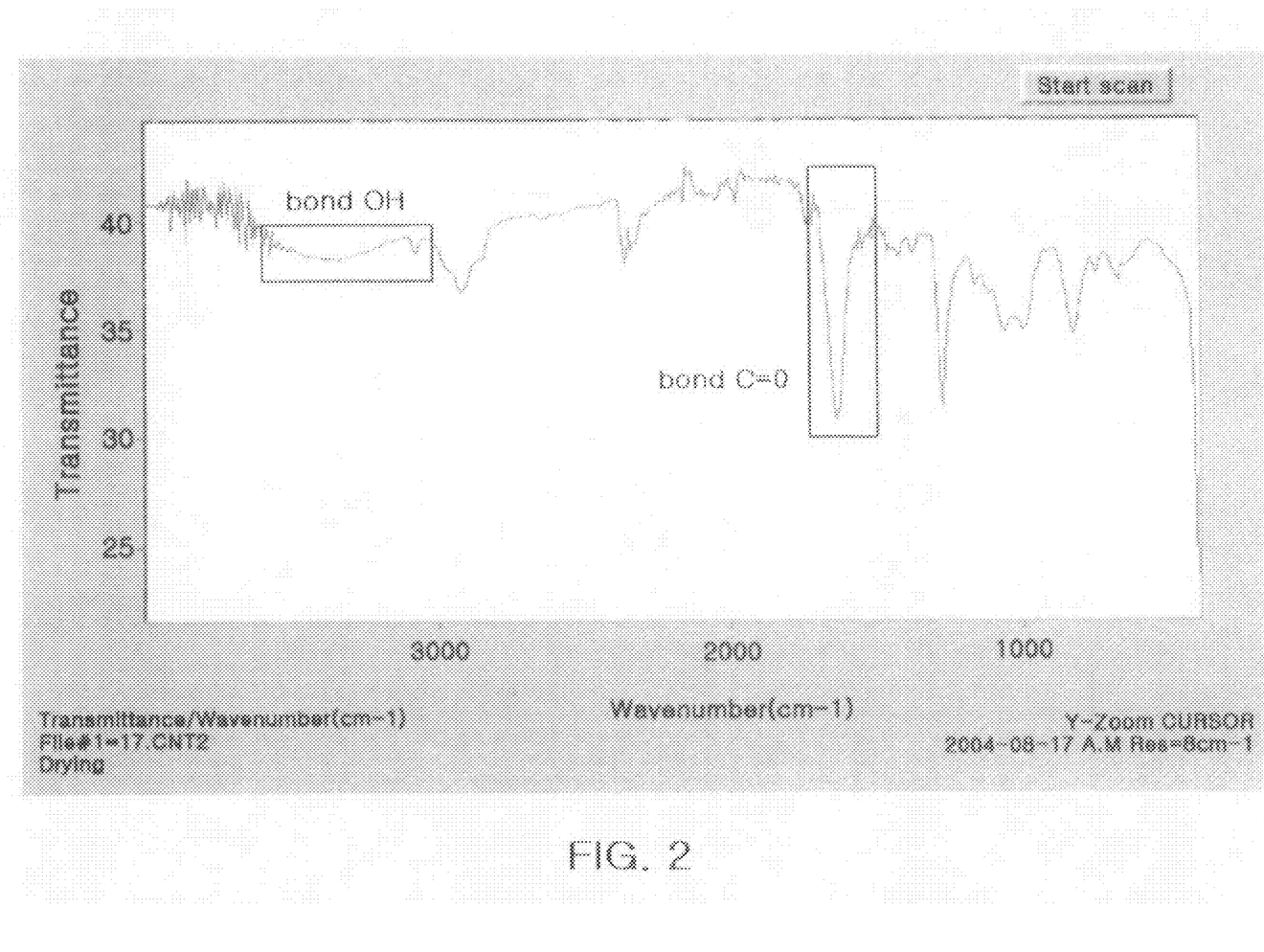
FIG. 2 is an FT-IR spectrum of CNTs having the carboxyl group prepared in Example 1, according to the present invention.

The filtration process was carried out using a filter paper having a pore size of 0.5-1 µm. The filtrate was diluted and washed several times with deionized water until pH reached a neutral value. At this time, pH was measured using a litmus paper. The neutralized MWNTs-COOH solution was dried at 80° C. for 6 hr. Then, whether the COOH group had been formed on the dried MWNTs-COOH was confirmed using FT-IR. The results are shown in FIG. 2. As shown in FIG. 2, a peak corresponding to C=O is shown at 1700 cm$^{-1}$ and a peak corresponding to O—H at 3300 cm$^{-1}$. From this, it can be found that —COOH group is formed on the CNTs.

EXAMPLE 2

10 mg of MWNTs-COOH prepared in Example 1, 20 mg of guanidine, and 5 ml of 2 M oxalic acid were dissolved in dichloromethane in an argon inert atmosphere, and then reacted at 50° C. for about 6 hr in an argon inert atmosphere, to introduce a guanidine group to a —COOH group formed on the MWNTs. The reaction solution was filtered to remove by-products therefrom, yielding a reaction product, MWNTs-CO—(NH)$_2$NH$_2$ represented by Formula 9, below. The filtration process was performed using a filter paper having a pore size of 0.5-1 µm.

Formula 9

EXAMPLE 3

The dispersibility of MWNTs-CO—(NH)$_2$NH$_2$ prepared in Example 2 was measured.

As such, the dispersibility was assayed by measuring dispersion stability and dispersion state of MWNTs having no functional group and MWNTs-CO—(NH)$_2$NH$_2$ using Turbiscan.

The dispersion stability is determined to the extent that the particles are stably maintained at regular intervals from each other in the solvent or from the solvent molecule for a long period of time. The dispersion stability was assayed by changes in the average value of transmittance varying with the time.

The dispersion state is determined to the extent that the particles are uniformly dispersed in the vessel at a predetermined point in time, and is an index showing no settlement or agglomeration of particles. The dispersion state was assayed by the difference between the maximal value and the minimal value of the transmittance measured at the same time.

Figure 3:
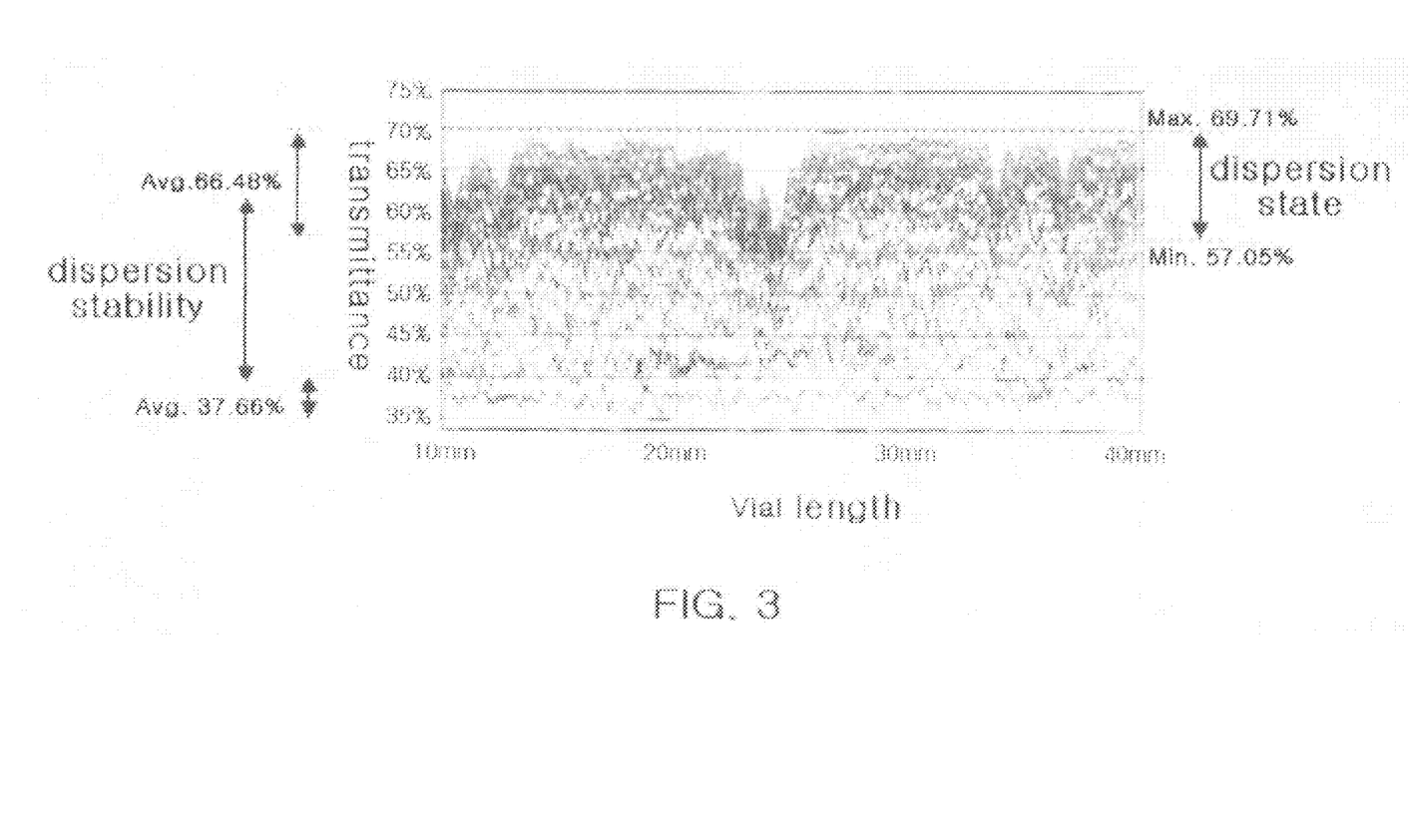
FIG. 3 is a graph showing the dispersibility of CNTs having no functional group using Near IR spectroscopy.

5 mg of MWNTs having no functional group were dispersed in 100 ml of deionized water, with sonication at 30 kHz, to obtain a dispersed solution, which was exposed to near infrared rays for 12 hr. As such, transmittance was measured every 1 hr for a total of 12 hr using Turbiscan. The results are shown in FIG. 3, in which the dispersion stability and dispersion state of MWNTs having no functional group dispersed in the aqueous solution are shown. In the graph shown in FIG. 3, the dispersion stability shows the change in transmittance of 28.82% for 12 hr, and the dispersion state shows the change in transmittance of 12.66%. Further, it appears that MWNTs are settled, or MWNTs agglomerate among themselves, forming large particles, over time.

Figure 4:
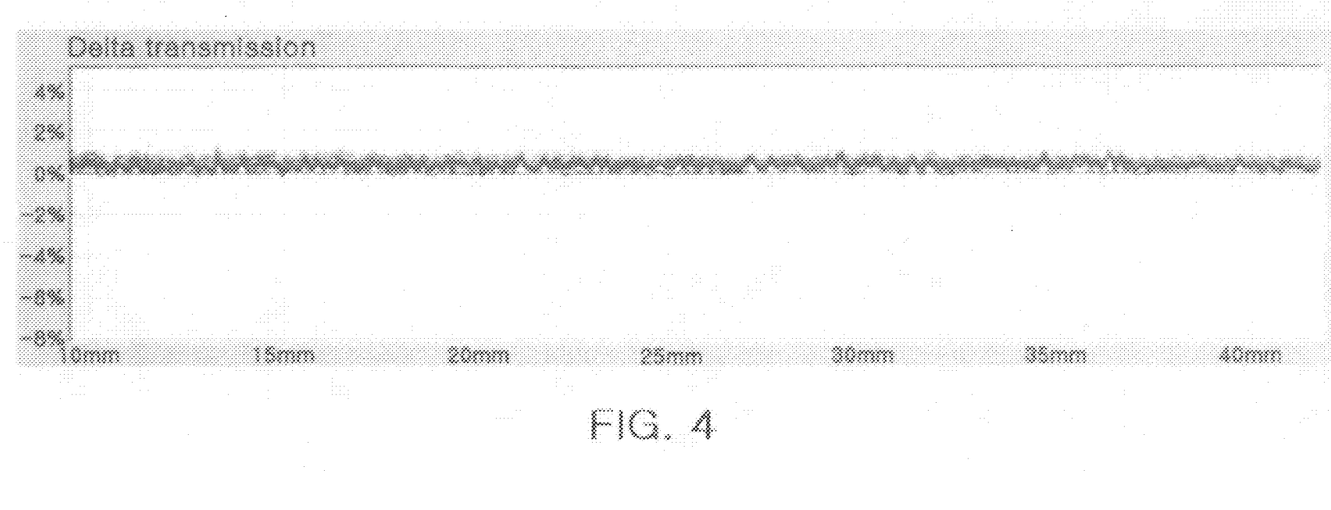
FIG. 4 is a graph showing the dispersibility of CNTs having guanidine groups, according to the present invention.

Meanwhile, 5 mg of MWNTs-CO—$(NH)_2NH_2$ were dispersed in 100 ml of deionized water, with sonication at 30 kHz, to obtain a dispersed solution, which was exposed to near infrared rays for 12 hr. As such, transmittance was measured every 1 hr for a total of 12 hr using Turbiscan. The results are shown in FIG. 4. In the graph shown in FIG. 4, although the transmittance is little changed and its difference is not distinguished in the drawing, the dispersion stability shows the change in transmittance of 4.974% for 12 hr, and the dispersion state shows the change in transmittance of 1.205%. That is, compared to MWNTs having no functional group in which the difference of the average value of transmittance for 12 hr is 28.82% and the difference between the maximal value and the minimal value of transmittance measured at the same time is 12.66%, the aqueous solution including MWNTs-CO—$(NH)_2NH_2$ dispersed therein has the smaller values. From this, it can be found that the dispersion stability and dispersion state of MWNTs-CO—$(NH)_2NH_2$ are further increased to 5.70 times and 10.5 times, respectively, thus exhibiting better dispersibility.

EXAMPLE 4

5 g of a polystyrene polymer and 1 g of dibenzo-18-crown-6-ether were dissolved in 500 ml of pyridine and then reacted for about 5 hr while being stirred at room temperature using a magnetic stirrer at 200 rpm. 500 ml of deionized water was added to the reaction solution. By adding the deionized water, polystyrene having crown ether attached thereto was dispersed in deionized water, while by-products, such as non-reactive materials, were dispersed in the pyridine solvent, in which deionized water and pyridine were separated due to the difference in density therebetween. Thus, the deionized water was separated from the pyridine solvent using a separate funnel, whereby the polystyrene having crown ether attached thereto was removed from the non-reactive by-products. The pyridine solvent was distilled off, yielding a polystyrene polymer having crown ether attached thereto, represented by Formula 10, below:

Formula 10

The product of Formula 10 thus obtained was spin applied to a film thickness of 200 μm on one surface of a 1 mm thick copper substrate, and then dried in a semi-dry state of B-step at 50° C.

Figure 5:
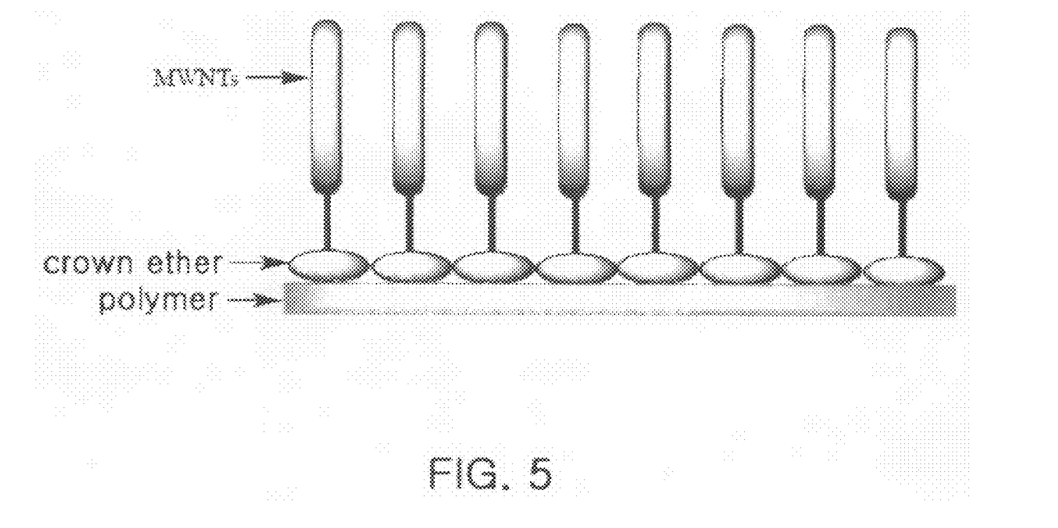
FIG. 5 is a view showing a substrate having multi-walled CNTs aligned perpendicularly to the substrate at regular intervals thereon, according to the present invention.

Subsequently, 10 mg of MWNTs-CO—$(NH)_2NH_2$ prepared in Example 2 were dispersed in 100 ml of ethanol, and then spin applied to a thickness of 200 μm on the semi-dried coating layer. Thereby, due to the reaction between the crown ether in the coating layer and the guanidine group, MWNTs was aligned perpendicularly to the substrate at regular intervals on the substrate. The substrate having MWNTs aligned perpendicularly to the substrate at regular intervals thereon is shown in FIG. 5.

EXAMPLE 5

5 g of the polystyrene polymer having crown ether attached thereto of Formula 10, prepared in Example 4, was added to 500 ml of pyridine and dispersed therein while being stirred at 200 rpm using a magnetic stirrer. Then, 10 mg of MWNTs-CO—$(NH)_2NH_2$ prepared in Example 2 were added to the above dispersed solution and reacted for about 30 min while weakly stirring them at 100 rpm using a magnetic stirrer. After the completion of the reaction, the guanidine group attached to MWNTs was introduced to the crown ether, as shown in FIG. 1b, thus obtaining a polystyrene polymer having a combination of guanidine group and crown ether.

The deionized water was added to the above reaction product, and hence, the polystyrene polymer having a combination of guanidine group and crown ether was dispersed in deionized water, while the by-products, such as non-reactive materials, were dispersed in the pyridine solvent, in which the deionized water and pyridine were separated due to the difference in density therebetween. Thus, the deionized water was separated from the pyridine solvent using a separate funnel, whereby the polystyrene polymer having a combination of guanidine group and crown ether was removed from the non-reactive by-products. The pyridine solvent was distilled off, yielding a polystyrene polymer having a combination of guanidine group and crown ether formed by introducing the guanidine group of MWNTs-CO—$(NH)_2NH_2$ to the crown ether.

The polymer having a combination of guanidine and crown ether thus obtained was spin applied to a thickness of 200 μm on one surface of a 1 mm thick nickel substrate, and then dried at 70° C., thus obtaining a substrate having MWNTs aligned perpendicularly to the substrate at regular intervals thereon.

EXAMPLE 6

The polystyrene polymer having crown ether attached thereto of Formula 10, prepared in Example 4, was manufactured into a 1.5 mm thick film, which was then dried in a semi-dry state of B-step at 50° C. Thereafter, 10 mg of MWNTs-CO—(NH)$_2$NH$_2$ prepared in Example 2 were dispersed in 100 ml of ethanol, to obtain a dispersed solution, which was then spin applied to a thickness of 200 µm on the above semi-dried polymer film. After the coating process, the crown ether in the coating layer reacted with the guanidine group, resulting in a polymer film having MWNTs aligned perpendicularly to the polymer film at regular intervals thereon.

EXAMPLE 7

The polystyrene polymer having a combination of guanidine group and crown ether, prepared in Example 5, was manufactured into a 1.5 mm thick film, and then dried at 70° C., thereby obtaining a polymer film having MWNTs aligned perpendicularly to the film at regular intervals thereon.

EXAMPLE 8

An AAO template having pores about 600 nm in diameter and a Pt electrode were installed as a cathode and an anode, respectively. Further, a solution of 10 mg of MWNTs-CO—(NH)$_2$NH$_2$ of Example 2 dissolved in 200 ml of deionized water was used, and a DC current of 40 V was applied, to perform electrophoresis. The electrophoresis was conducted for about 15 min. Thereby, MWNTs-CO—(NH)$_2$NH$_2$ were moved and inserted into the pores of the AAO template, thus obtaining a substrate having MWNTs-CO—(NH)$_2$NH$_2$ vertically inserted into its pores.

As mentioned above, the present invention provides methods of forming a guanidine group on CNTs and of attaching CNTs having guanidine groups on a substrate, and CNTs and a substrate manufactured by the above methods. The CNTs having guanidine groups of the present invention are hydrogen bonded with the solvent that is able to react with the guanidine group to form the hydrogen bond, and thus, are uniformly dispersed in the solvent. Further, since the guanidine group has three nitrogen atoms on which charges are distributable, the CNTs having guanidine groups are uniformly dispersed in the solvent through the electrostatic interactions due to the uniform charge distribution. By using the properties of the guanidine group able to be selectively combined with the crown ether, the CNTs having guanidine groups are aligned perpendicularly to the substrate at regular intervals on the substrate.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of forming a guanidine group on carbon nanotubes, comprising:
    forming a carboxyl group on carbon nanotubes; and
    forming a guanidine group on the carboxyl group of the carbon nanotubes.

2. The method as set forth in claim 1, wherein the forming of the carboxyl group is performed by adding the carbon nanotubes to a mixture of nitric acid and sulfuric acid mixed at a volume ratio of 3:1, and then reacting the carbon nanotubes and the mixture of nitric acid and sulfuric acid mixed at a volume ratio of 3:1, and then reacting the carbon nanotubes and the mixture of nitric acid and sulfuric acid for 22-26 hr with sonification at 50-60° C.

3. The method as set forth in claim 1, wherein the forming of the guanidine group is performed by adding the carbon nanotubes having the carboxyl group, a compound having a guanidine group, and a coupling agent to a solvent, and then reacting the carbon nanotubes, the compound having the guanidine group, and the coupling agent, at 25-50° C. for 6-10 her in an inert atmosphere.

4. The method as set forth in claim 3, wherein the compound having the guanidine group is selected from among guanidine, cyanoguanidine, and guanidine thiocyanide.

5. Then method as set forth in claim 3, wherein the coupling agent is selected from among 1-(3-dimethylaminopropyl)-3-ethyl-carboimide hydrochloride (EDC), dicyclohexylcarbodiimide (DCC), oxalic acid, and oxalic acid chloride.

6. The method as set forth in claim 3, wherein the coupling agent is used in an amount of 0.4-0.5 equivalents, based on 1 equivalent of the carbon nanotubes having the carboxyl group.

7. A carbon nanotube, comprising one or more bonded moieties, wherein the moiety is represented by Formula 1, below:

Formula 1

8. A substrate having carbon nanotubes attached thereto, comprising:
    a substrate;
    a polymer layer having crown ether attached thereto; and
    a coating layer of carbon nanotubes having one or more bonded moieties, in which the moiety is represented by Formula 1, below:

Formula 1

9. The substrate as set forth in claim 8, wherein the polymer layer is a coating layer or a film layer.

10. A substrate having carbon nanotubes attached thereto, comprising:
    a substrate; and
    a polymer layer formed by reacting a polymer having crown ether attached thereto with carbon nanotubes having one or more bonded moieties, in which the moiety is represented by Formula 1, below:

Formula 1

11. The substrate as set forth in claim 10, wherein the polymer layer is a coating layer or a film layer.

12. A substrate having carbon nanotubes attached thereto, comprising:

an anodized aluminum oxide substrate; and carbon nanotubes having one or more bonded moieties inserted into pores of the substrate, in which the moiety is represented by Formula 1, below:

Formula 1

* * * * *